US012602585B2

(12) United States Patent
Bucs et al.

(10) Patent No.: US 12,602,585 B2
(45) Date of Patent: Apr. 14, 2026

(54) METHODS AND SYSTEMS FOR DETERMINING A REPRESENTATIVE INPUT DATA SET FOR POST-TRAINING QUANTIZATION OF ARTIFICIAL NEURAL NETWORKS

(71) Applicant: Aptiv Technologies AG, Schaffhausen (CH)

(72) Inventors: Robert Lajos Bucs, Wuppertal (DE); Miguel Angel Aguilar, Düsseldorf (DE); Soeren Kreinberg, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 518 days.

(21) Appl. No.: 18/129,174

(22) Filed: Mar. 31, 2023

(65) Prior Publication Data

US 2023/0325662 A1      Oct. 12, 2023

(30) Foreign Application Priority Data

Apr. 7, 2022      (EP) ..................................... 22167202

(51) Int. Cl.
  *G06F 16/00*          (2019.01)
  *G06N 3/08*          (2023.01)
(52) U.S. Cl.
  CPC ..................................... *G06N 3/08* (2013.01)
(58) Field of Classification Search
  CPC ..................................................... G06N 3/08
  See application file for complete search history.

(56) References Cited

U.S. PATENT DOCUMENTS

2021/0174214 A1      6/2021   Venkatesan et al.
2023/0351180 A1*    11/2023   Oh ........................ G06N 3/0495

FOREIGN PATENT DOCUMENTS

CN          111723934 A        9/2020
CN          111967583 A       11/2020
CN          113449846 A        9/2021

OTHER PUBLICATIONS

Extended European Search Report issued by the European Patent Office in connection with International Application No. 22167202. 5, dated Sep. 28, 2022.

(Continued)

*Primary Examiner* — Ajith Jacob
(74) *Attorney, Agent, or Firm* — Harness, Dickey & Pierce, P.L.C.

(57)          ABSTRACT

A computer implemented method for determining a representative input data set for post-training quantization of artificial neural networks comprises: acquiring an input data set; processing the input data set to extract one or more parameters associated with the input data set; setting clipping limits comprising a lower clipping limit and an upper clipping limit; adapting the upper and lower clipping limits by computing (656) a quantization error based on a numerical difference between the input data set and a quantized and a dequantized input data set, wherein the error is computed based on an error metric which is based on user input; and determining a representative input data set as a subset of the input data set whose elements fit within the clipping limits; wherein the representative input data set is to be used for quantization calibration of the post-training quantization.

14 Claims, 9 Drawing Sheets

100

(56) References Cited

OTHER PUBLICATIONS

Figure 1:
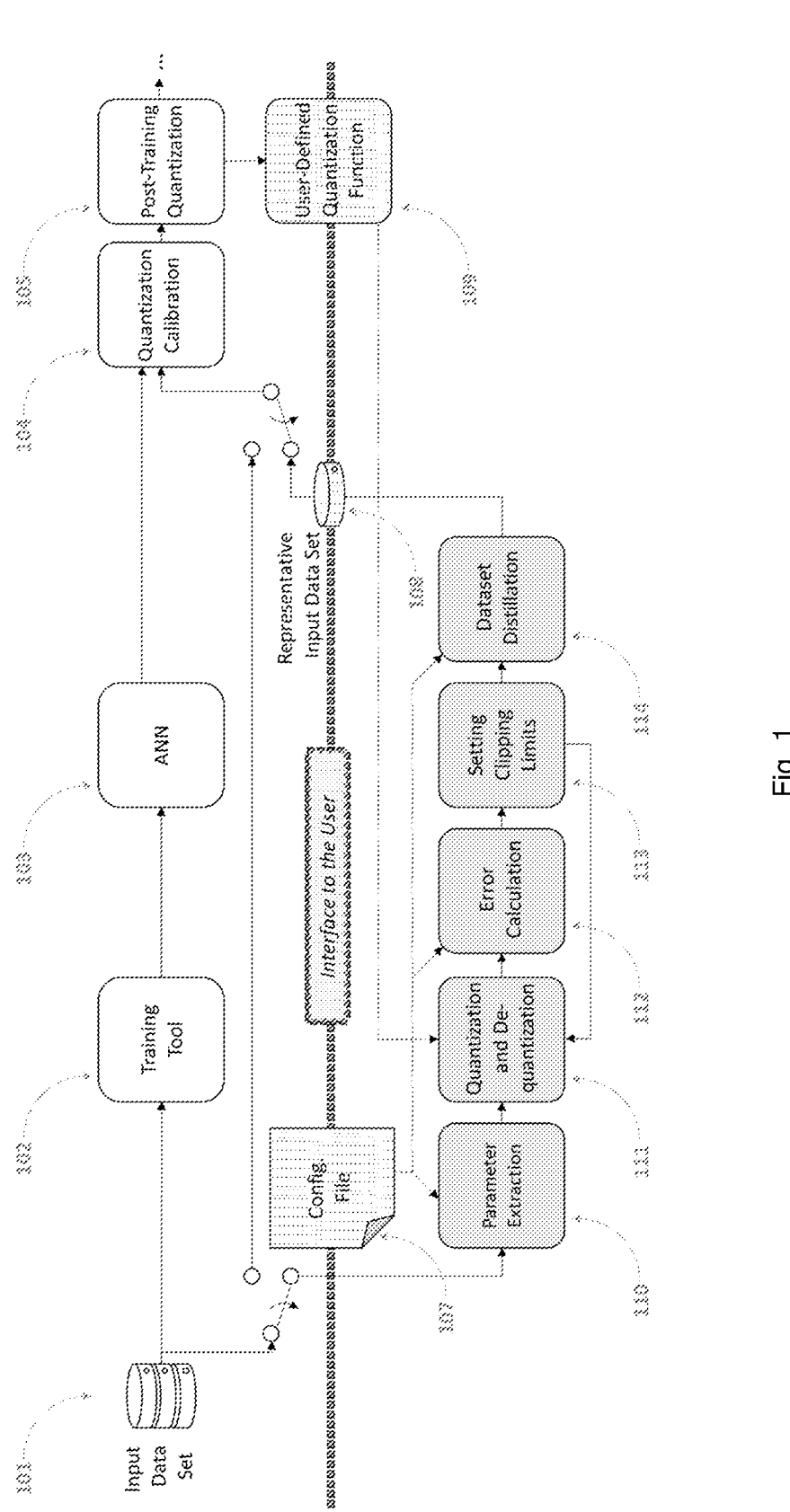

Alexaner Goncharenko, et al., "Trainable Thresholds for Neural Network Quantization", Advances In Databases and Information Systems; Springer International Publishing, pp. 302-310, May 16, 2019.

Anonymous authors, "ACIQ: Analytical Clipping for Integer Quantization of Neural Networks", paper under double-blind review, pp. 1-11.

Szymon Migacz, "8-bit Inference with TensorRT", Nvidia, pp. 1-41, 2017.

Yaohui Cai, et al., "ZeroQ: A Novel Zero Shot Quantization Framework", Computer Vision Foundation, IEEE Xplore, pp. 1-10, 2020.

Ritchie Zhao, et al., "Improving Neural Network Quantization without Retraining using Outlier Channel Splitting", International Conference on Machine Learning, pp. 1-10, 2019.

Tensor Virtual Machine (TVM), Apache, [Online]. Available: https://tvm.apache.org.

First Office Action regarding Chinese Application No. 202310296016. 0, dated Dec. 8, 2025. Translation provided by Google Translate.

* cited by examiner

400

```
1 {
2     "mean_metric"     :  "median",
3     "variance_metric" :  "mad",
4     "qerror_metric"   :  "mse",
5     "distill_percent" :  0.015
6 }
```

Fig. 4

<u>600</u>

650

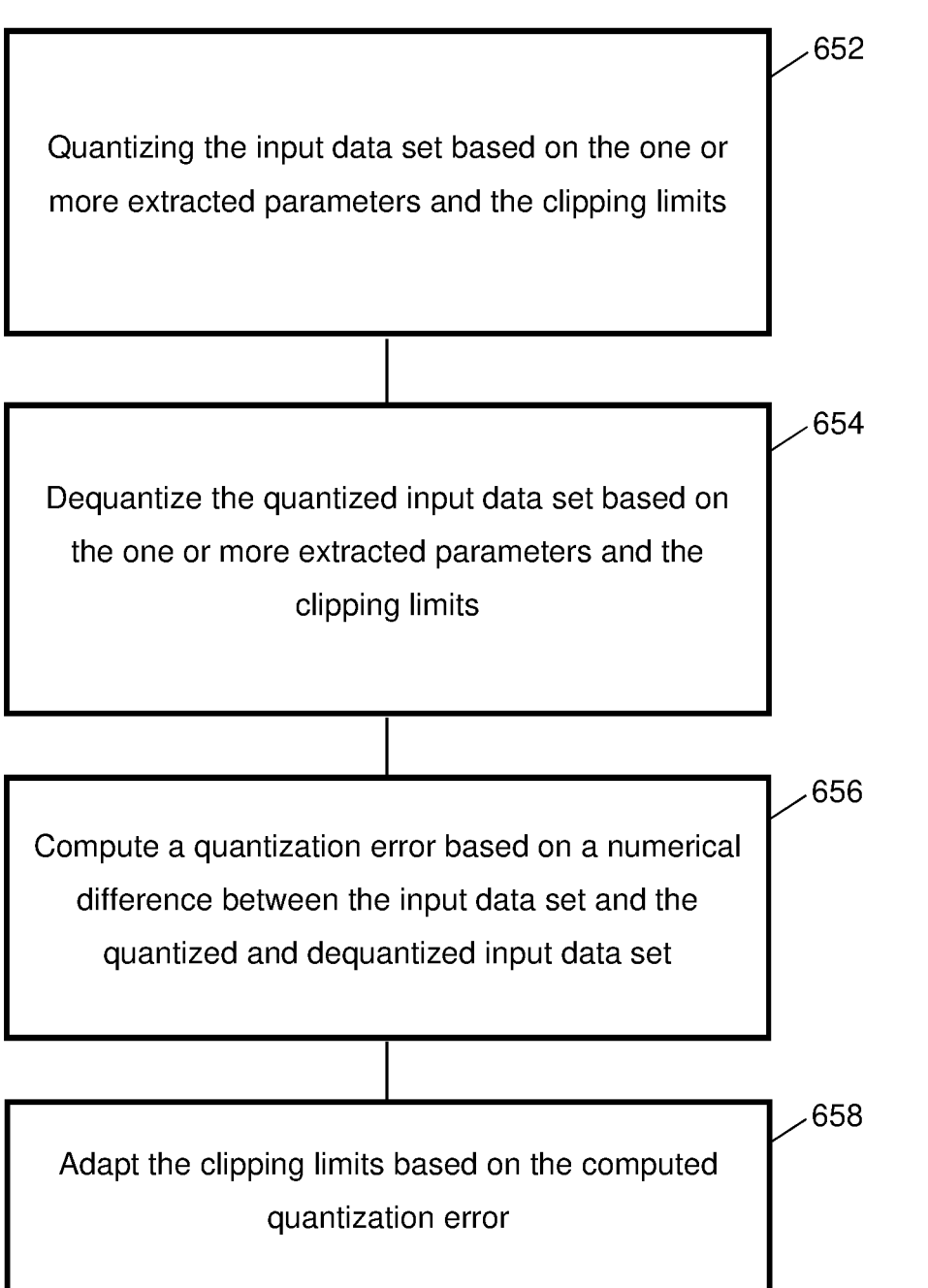

652

Quantizing the input data set based on the one or more extracted parameters and the clipping limits

654

Dequantize the quantized input data set based on the one or more extracted parameters and the clipping limits

656

Compute a quantization error based on a numerical difference between the input data set and the quantized and dequantized input data set

658

Adapt the clipping limits based on the computed quantization error

Fig. 6B

700

METHODS AND SYSTEMS FOR DETERMINING A REPRESENTATIVE INPUT DATA SET FOR POST-TRAINING QUANTIZATION OF ARTIFICIAL NEURAL NETWORKS

CROSS-REFERENCE TO RELATED APPLICATION

This application claims the benefit of European patent application serial number EP 22167202.5 filed on Apr. 7, 2022. The entire contents of which are hereby incorporated by reference herein.

FIELD

The present disclosure relates to methods and systems for determining a representative input data set for post-training quantization of artificial neural networks.

BACKGROUND

Machine Learning (ML) has become ubiquitous nowadays in various sectors, such as computer vision, automotive, medical, financial and numerous other areas. ML methods are frequently implemented in a certain form of artificial neural networks (ANNs), i.e., structures that can be trained to efficiently learn specific tasks. Despite their higher computational and memory requirements, a strong demand is emerging on the application of ANNs on edge devices, i.e., resource-constrained embedded systems. This paradigm shift poses thus significant challenges on deploying ML models.

Commonly applied techniques addressing this challenge revolve around ANN compression, of which a frequently applied approach is quantization, i.e., the transformation of ANNs from their original floating-point to a more concise integer arithmetic representation. A method called Post-Training Quantization (PTQ) focuses on implementing the floating-point to integer transition and minimizing the quantization noise on the readily trained model. One particular step during PTQ, called quantization calibration, aims at feeding a set of exemplary inputs to the ANN, collecting statistical properties (e.g., per-layer minima/maxima) and using these statistics to improve quantization and to increase network accuracy.

However, quantization calibration is only as effective, as well the gathered input data set represents all values observed on particular network inputs. Thus, identifying the data set that characterizes the network inputs in the best way, i.e., the representative input data set, is crucial for maintaining the highest possible accuracy.

Thus, it may be desired to provide effective and efficient methods for determining a representative input data set.

Zhao et al. (R. Zhao, Y. Hu, J. Dotzel, C. De Sa and Z. Zhang, "Improving Neural Network Quantization without Retraining using Outlier Channel Splitting") propose a method in which deep neural networks are post-training modified by duplicating channels that contribute to outliers in the statistical properties of weights/activations. This, however, requires model access for performing the proposed modifications. Moreover, the method leverages quantization error reduction but only at the cost of network size increase.

Banner et al. (R. Banner, Y. Nahshan, E. Hoffer and D. Soudry, "ACIQ: Analytical Clipping for Integer Quantization of neural networks," 2019) study per-layer statistics with the strong assumptions that deep neural network weights/activations resemble Gaussian or Laplacian distributions and assume properties based on the usage of batch normalization. Based on these postulations, they analytically find the minimal quantization error and the matching clipping limits, given some statistical properties and the desired bit-width. The above assumptions, however, do not generally hold for global ANN inputs on which the representative data set and the quantization calibration is based on. Lastly, if the target hardware imposes any specific constraint on quantization, the user would either need to integrate such traits into the approach or would need to modify the target-specific deployment tool. Such actions are not practically applicable in production. Migacz et al. (Migacz, Szymon, "8-bit Inference with TensorRT," NVIDIA, 2017) present a calibration method which was integrated into NVIDIA's TensorRT framework, as well as in the open-source TVM ("Tensor Virtual Machine (TVM)," Apache, [Online]. Available: https://tvm.apache.org/) deployment tool. Following the approach, activation statistics are gathered from thousands of samples of the provided data set, and the so-called Kullback-Leibler Divergence (KLD) is used to find the clipping threshold with the lowest quantization loss. A drawback is that many executions of the ANN forward path are needed to gather the required statistics. Moreover, calculating the KLD metric is highly computationally intensive, deeming the technique overall rather time-consuming. Lastly, this approach also suffers if quantization conflicts arise with target hardware platform.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a representative input data set for post-training quantization of artificial neural networks, the method comprising of the following steps:

acquiring an input data set;

processing the input data set to extract one or more parameters associated with the input data set, wherein metrics applied to the input data set to extract the one or more parameters are based on user input;

based on the extracted one or more parameters, setting initial values for clipping limits comprising a lower clipping limit and an upper clipping limit, wherein the lower clipping limit and the upper clipping limit define threshold values for limiting a value range of the input data set;

adapting the upper and lower clipping limits by computing a quantization error based on a numerical difference between the input data set and a quantized and a dequantized input data set, wherein the error is computed based on an error metric which is based on user input and determining a representative input data set as a subset of the input data set whose elements fit within the clipping limits; wherein the representative input data set is to be used for quantization calibration of the post-training quantization.

According to various embodiments, the upper and lower clipping limits are adapted by iteratively carrying out:

quantizing the input data set by mapping values of the input data set from a set of higher numerical precision to values of lower numerical precision based on the one or more extracted parameters and the clipping limits; dequantizing the quantized input data set by mapping values of the quantized input data set from lower numerical precision back to higher numerical precision based on the one or more extracted parameters and the clipping limits; computing the quantization error based on the numerical difference between the input data set and the quantized and dequantized input data set; and adapting the clipping limits based on the computed quantization error.

With the method according to various embodiments, a representative input data set with preferably a reduced size of elements is determined, and this representative input data set is used for quantization calibration. Due to the reduced size of the representative input data set, the computational effort for quantization calibration is reduced. Due to the specific selection of the elements of the representative input data set, quality of the quantization calibration is maintained or even improved (e.g., removing outliers), despite the reduced size of the representative input data set.

According to various embodiments, the input data set comprises of a plurality of elements (in other words: frames), and each of the elements comprises a plurality of values.

According to various embodiments, the clipping limits are adapted until a difference between changed clipping limits from one iteration to another iteration are below a predetermined threshold. This may provide efficiency of the method, since not more iterations than necessary are carried out.

According to various embodiments, the threshold is based on the input data set, preferably one or more parameters defined by the input data set, and the threshold is based on user-input. This may allow a user to tailor the method to the specific requirements of the user and may allow easy configurability.

According to various embodiments, the user input is provided in a configuration file, preferably a textual configuration file. This may allow a user to tailor the method to the specific requirements of the user and may allow easy configurability.

According to various embodiments, the clipping limits define a lower threshold and an upper threshold which are used to delimit the quantization of the input data set.

According to various embodiments, the method further comprises determining a scale, wherein the scale is used for quantization and dequantization.

According to various embodiments, determining the representative input data set comprises determining an overlap between an interval defined by the clipping limits and the input data set. This may provide that the representative input data set provides a good representation of the input data set in view of the clipping limits.

According to various embodiments, the quantization error is determined based on a user-defined error function. This may allow a user to tailor the method to the specific requirements of the user and may allow easy configurability.

According to various embodiments, the quantization error is determined based on a mean squared error and/or a mean average error and/or a peak signal to noise ratio and/or the a Kullback-Leibler divergence metric.

According to various embodiments, quantization calibration comprises calibrating parameters for a network quantization of artificial neural networks.

According to various embodiments, the artificial neural network is to be deployed on a resource-constrained embedded system. Due to the efficiency of the quantized network, it may be possible to deploy the quantized network on the resource-constrained embedded system.

According to various embodiments, the embedded system is a mobile computing device, a mobile phone, a tablet computing device, an automotive compute platform, or an edge device.

In another aspect, the present disclosure is directed at a computer system, said computer system comprising a plurality of computer hardware components configured to carry out several or all steps of the computer implemented method described herein.

The computer system may comprise a plurality of computer hardware components, for example a processor, for example processing unit or processing network, at least one memory, for example memory unit or memory network, and at least one non-transitory data storage. It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Various embodiments may extract the representative input data set for quantization calibration to compress a ANN while maintaining floating-point accuracy.

Various embodiments may provide representative data set extraction for post training quantization calibration of artificial neural networks.

DRAWINGS

Figure 2:
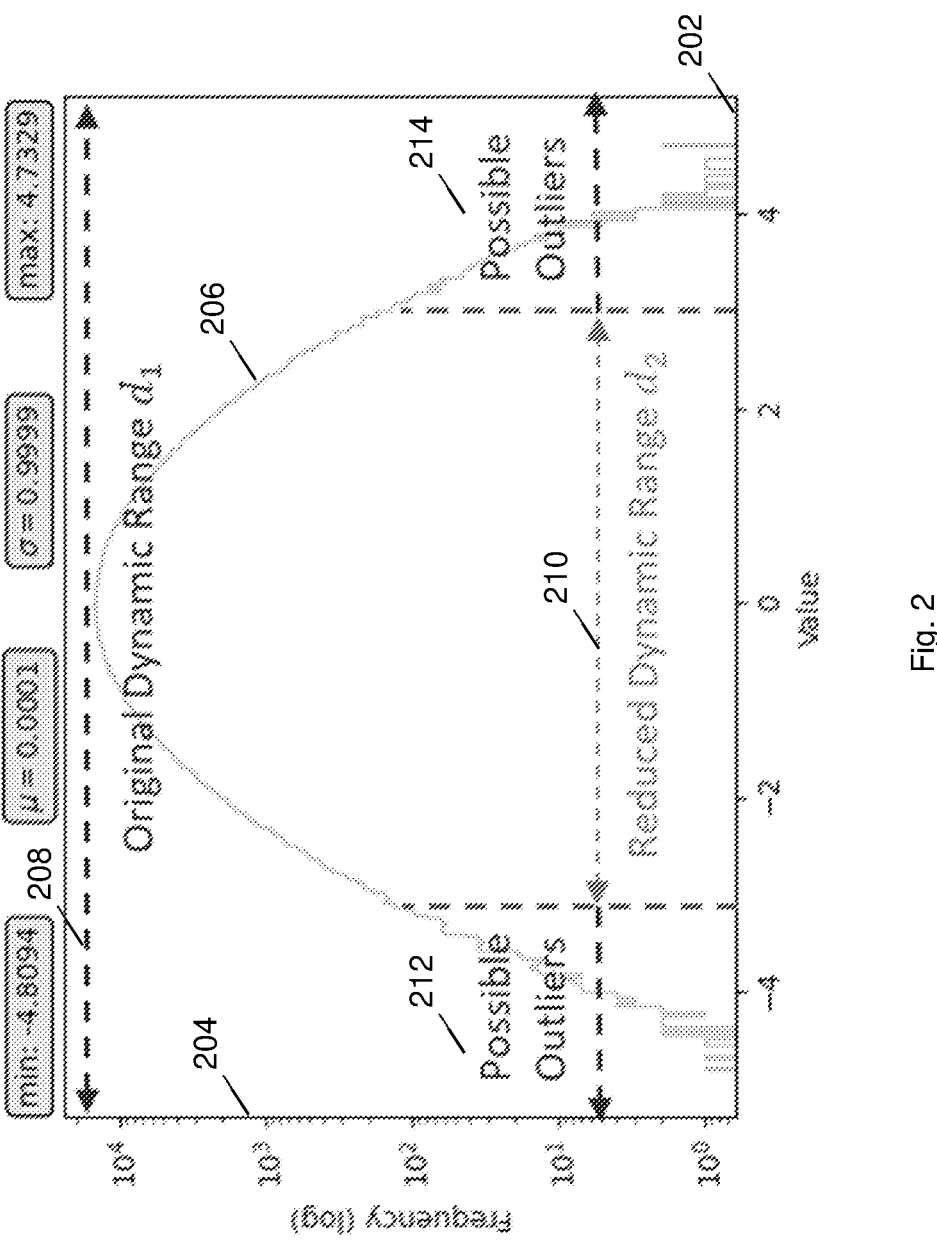
Figure 3:
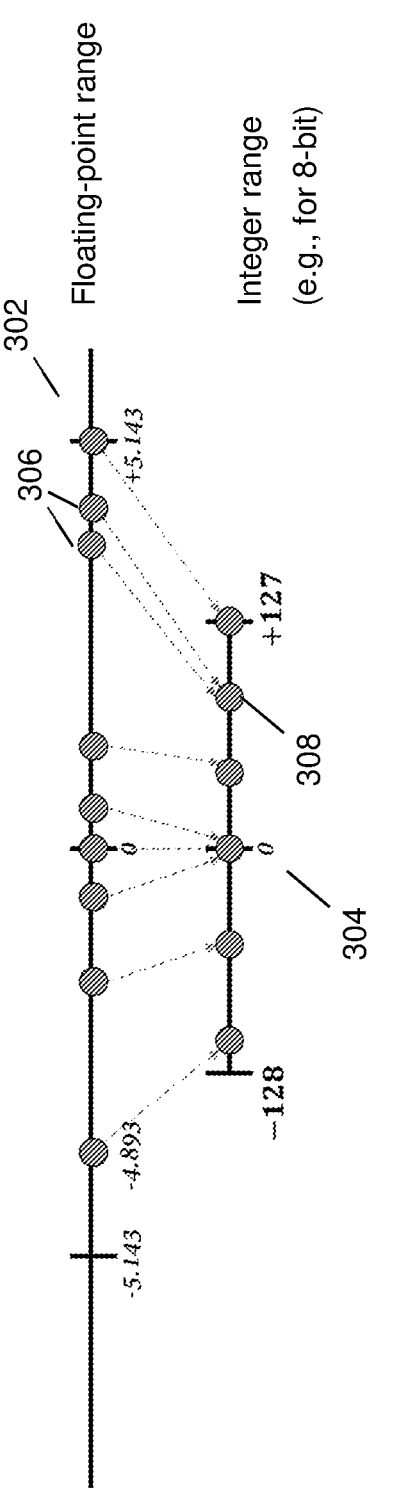
Figure 5:
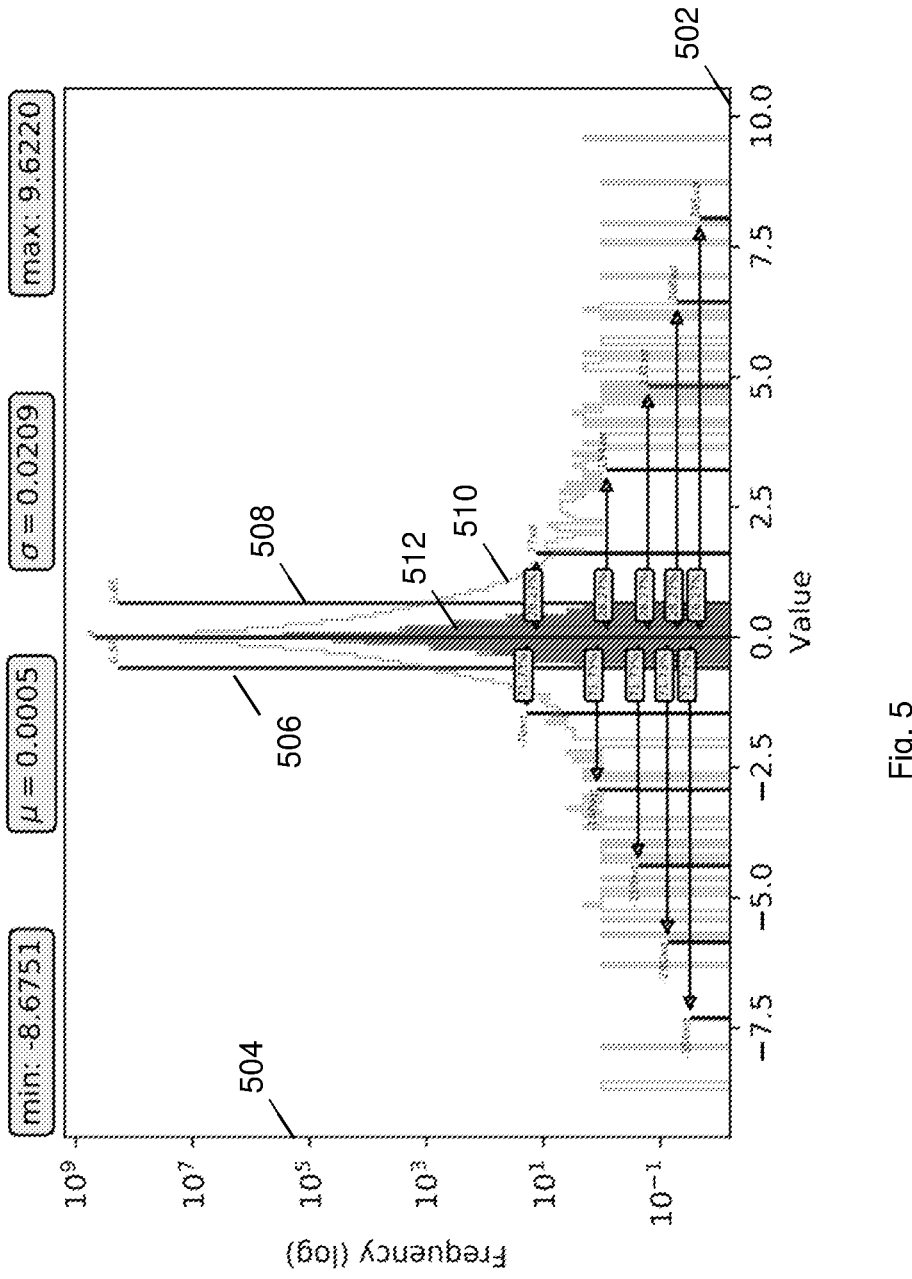
Figure 6A:
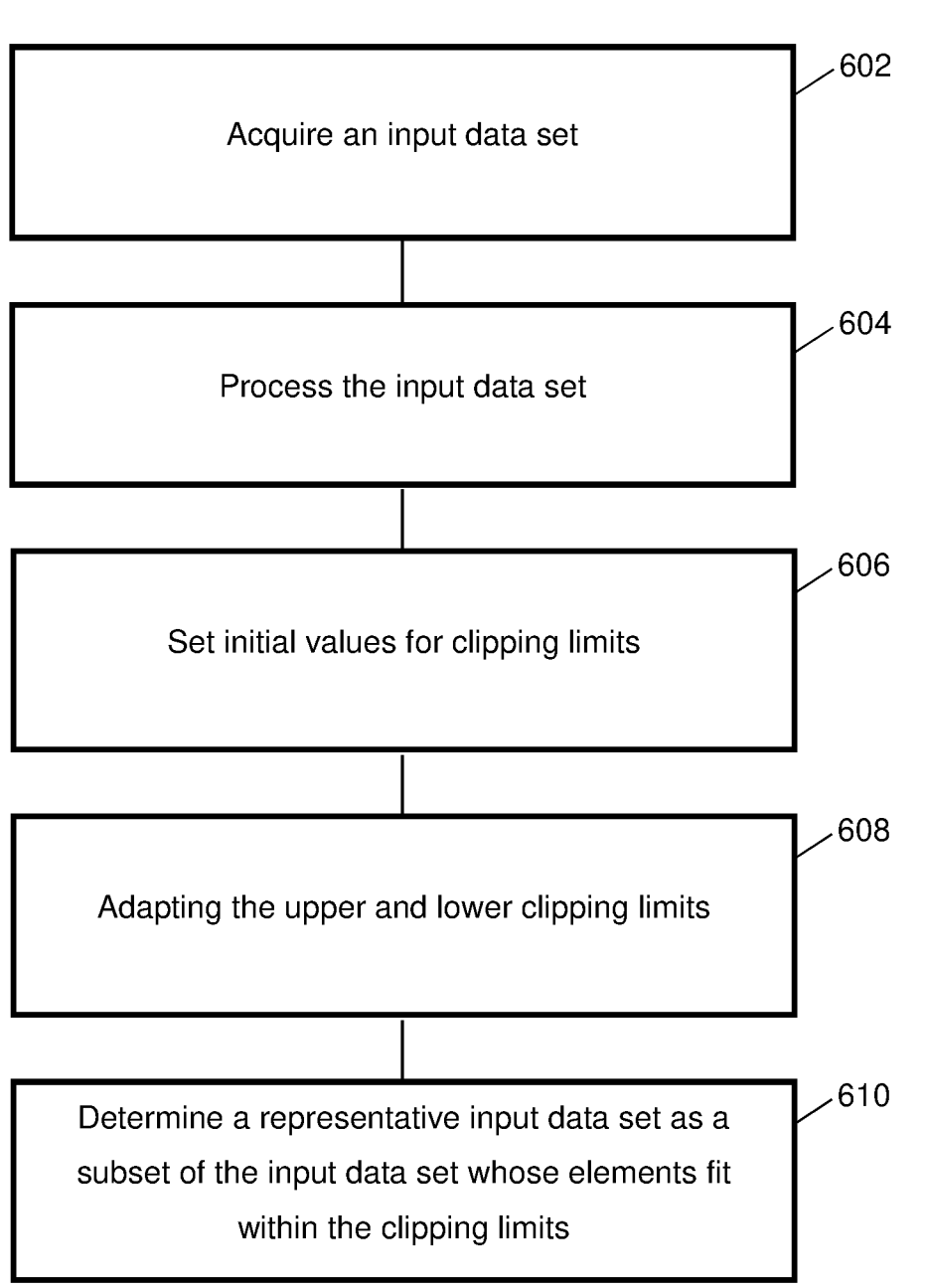

Exemplary embodiments and functions of the present disclosure are described herein in conjunction with the following drawings, showing schematically:

FIG. 1 an illustration of a high-level block diagram of a system according to various embodiments;

FIG. 2 a histogram of a zero-centered normal distribution;

FIG. 3 a high-level depiction of symmetric, linear uniform quantization;

FIG. 4 an illustration of an exemplary user configuration file;

FIG. 5 an illustration of an exemplary result of various embodiments;

FIG. 6A a flow diagram illustrating a method for determining a representative input data set for post-training quantization of artificial neural networks according to various embodiments;

5
6

Figure 7:
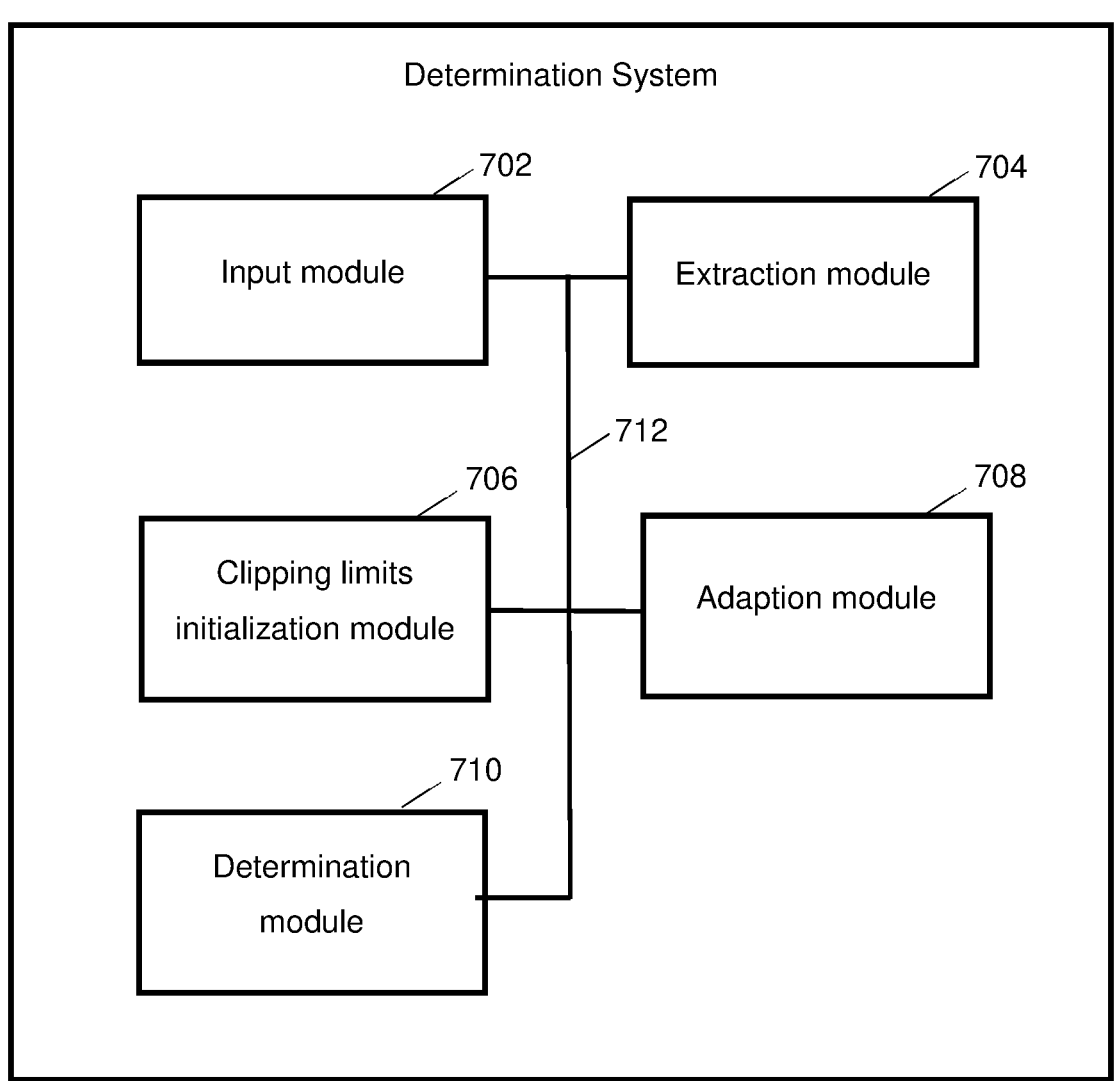

FIG. 6B a flow diagram illustrating the adapting shown in FIG. 6A;

FIG. 7 a determination system according to various embodiments; and

Figure 8:
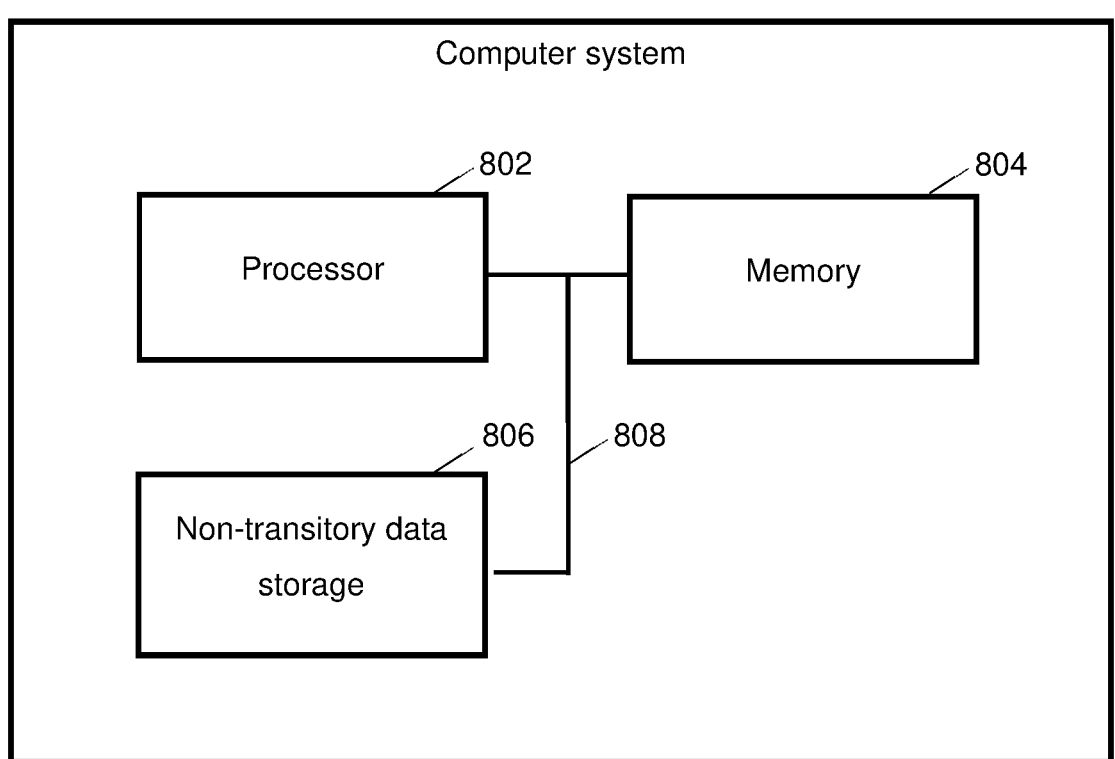

FIG. 8 a computer system with a plurality of computer hardware components configured to carry out steps of a computer implemented method for determining a representative input data set for post-training quantization of artificial neural networks according to various embodiments.

DETAILED DESCRIPTION

Machine Learning (ML) has become ubiquitous in various sectors, such as computer vision, automotive, medical, financial and numerous other areas. ML algorithms may be implemented in a certain form of Artificial Neural Networks (ANNs), i.e., structures that can be trained to efficiently learn specific tasks. Despite their higher computational and memory requirements, a strong demand is emerging on the application of artificial neural networks (ANNs) on edge devices, i.e., resource-constrained embedded systems. This paradigm shift poses challenges on deploying ML models.

"Deploying" may refer to embodying an artificial neural network, for example represented by a computational graph, in a system for application (in contrast to embodying the computational graph for analysis purposes or training purposes).

A computational graph may also be referred to as computational network, or as graph, or as network, or as net.

One technique addressing the deployment challenge may revolve around ANN compression, of which a possible approach is quantization, i.e., mapping values from a set of higher numerical precision (of a continuous set) to values of lower numerical precision (of a countable set), for example the transformation of ANNs from their original floating-point to a more concise integer arithmetic representation. Such a reduction of numerical precision significantly compresses ANNs, with the imminent trade-off of losing network accuracy.

According to various embodiments, Post-Training Quantization (PTQ) may be provided which focuses on implementing the floating-point to integer transition and minimizing the quantization noise on the readily trained model.

According to various embodiments, as one step during PTQ, quantization calibration may be provided and may provide feeding a set of exemplary inputs to the ANN, collecting statistical properties (e.g., per-layer minima/maxima) and using these statistics to improve quantization and to increase network accuracy. However, efficiency of quantization calibration may depend on how well the gathered input data set represents all values observed on particular network inputs. Thus, identifying the data set that characterizes the network inputs in the best way, i.e., the representative input data set, is crucial for maintaining the highest possible accuracy. However, gathering such data requires subjective manual analysis and selection of, e.g., input images from distinct scenarios. This process is not just tedious and time consuming but also might not lead to reaching the desired network accuracy goals in the end. Feeding mismatching data to the network may lead to miscalibration and eventually to major accuracy losses.

Moreover, the exploration phase of the subsequent quantization stage may be exhausting, involving numerous trial-and-error cycles for testing different quantization settings, with each such iteration requiring the re-execution of the lengthy calibration process.

Methods and systems for various embodiments may:

(i) eliminate the need of the subjective manual input selection phase, (ii) accelerate the calibration process to enable more time for quantization exploration, and (iii) improve or preserve the best possible accuracy for quantization.

FIG. 1 shows an illustration 100 of a high-level block diagram of a system according to various embodiments.

According to various embodiments, quantization calibration may be enhanced by introducing a runtime-efficient, statistics-based technique to extract the representative input data set by minimizing the estimated quantization error. The methodology according to various embodiments may lie between training and deployment, and may thus be agnostic to training, and deployment and PTQ frameworks. This may provide that the methods according to various embodiments are applicable in production environments.

The development steps for training and quantization are denoted by 101-105 in FIG. 1. The inputs and outputs of the framework are denoted 101 and 107-109, which collectively constitute the interface of the invention toward a user or third party. Various functional elements of the framework are denoted 110-114, for which details are presented below.

The ANN development may start with gathering and labeling data for the envisioned ML task. The data that may be provided as input is denoted by input data set 101. The input data set 101 may include a training set data to be applied during training and test set data to be applied during testing.

An ANN model 103 may be constructed using a training tool 102.

Once the ANN model 103 is readily trained, the input data set 101 may include data to be used to perform quantization calibration 104. Any element or subset (or the whole set) of the input data set 101 may be used to perform the quantization calibration 104. The gathered per-layer statistics may enable the deployment tool to quantize the model, i.e. to execute or implement post-training quantization 105.

Lastly, the quantized ANN may be deployed, executed and analyzed on the hardware. If, however, quantization does not provide satisfactory results, the calibration and quantization steps 104-105 may be repeated iteratively. Finding the right settings for PTQ may involve numerous trial-and-error cycles. Moreover, in certain deployment frameworks, quantization calibration needs to use a target hardware emulation environment to gather statistics, which may slow down the calibration process by several orders of magnitudes compared to the time one might expect for calibration on a workstation or even on the target hardware itself. By reducing the size of the calibration data set, various embodiments may accelerate the lengthy calibration procedure of this flow, without the user or a third party disclosing any details about the ANN or the input data set.

According to various embodiments, the representative input data 108 may be identified and extracted from any larger set using parameter extraction methods instead of subjective input selection. Moreover, the found representative input data set 108 may allow to reduce quantization calibration time, as it is only a tiny fraction of the input data set 101, while even improving accuracy.

The quantization error may strongly be correlated with the so-called dynamic range of the data, i.e., the difference between the smallest and the largest observed values. To underline this, the so-called quantization step size may be a crucial factor, which is the smallest possible difference between floating-point values which can still be distinguished as integer numbers after quantization. With higher dynamic range, the quantization step size also increases, granting less resolution for single floating-point values during quantization, assuming a linear equidistant quantization mode.

Observed tensor data may follow certain distributions, where the values around the mean may occur most frequently, while the number of values further away decays exponentially. The latter may be considered outliers of the distribution, which undesirably increase the dynamic range. The resolution may be increased by limiting the dynamic range in some way, which may especially be beneficial for more frequently observed values. Thus, the identification and removal of outliers may be of utmost importance.

To achieve this, various embodiments may apply parameter extraction 110 on the data set. For each input element (or input frame), first the dynamic range of the data may be determined by identifying the global minimum and maximum values. Next, statistical measures may be computed to identify the most frequent value(s) and the amount of variation in the distribution. The concrete mathematical functions of these measures may be selected by the user from a set of options via a configuration file 107, as an input to the framework according to various embodiments. Regardless of the exact measures and their computation, the identified statistical properties may serve as the fundament for an automated analysis, and for extracting parameters as will be described in more detail below.

In an embodiment, the parameter extraction 110 may include extracting statistical properties.

FIG. 2 shows a histogram 200 of a zero-centered normal distribution. Curve 206 shows the observed values (on x axis 202) plotted against their occurring frequencies using a logarithmic scale (on y axis 204).

The observed values range from −4.8094 to +4.7329, i.e., the dynamic range 208 of the data is $d_1$=9.5423. The mean $\mu$, where values occur most frequently, is located around zero. Considering the standard deviation $\sigma \approx 1$, beyond approximately $\pm 3\sigma \approx \pm 3$, values can be observed very rarely and are possible outliers 212, 214 of the distribution. Assuming b=8 bit quantization, the quantization step size may be calculated as $$\Delta_1 = \frac{d_1}{2^b - 1} = \frac{9.5423}{255} = 0.0374.$$

If, however, the outliers of the distribution would be removed, the dynamic range would reduce to $d_2$=6, as illustrated in FIG. 2 by reduced dynamic range $d_2$ 210. This would reduce the quantization step size to $\Delta_2$=0.0235, granting more resolution and potentially increasing accuracy.

According to various embodiments, simple metrics for statistical measures, for example the mean and the standard deviation or variance of the data, may be used. For more robust, outlier-proof measures, the median and the Median Absolute Deviation (MAD) may be applied. The former is the center-most element in a sorted distribution, while the latter is measure for variability of the data, calculated as:

$$\text{MAD} = \text{median}(|x_i - \text{median}(x)|) \tag{1}$$

wherein $x_i$ denotes the ith element of the distribution x.

In a subsequent step, quantization and de-quantization 111 may be provided: The simulation of quantization may be performed, followed by its opposite de-quantization operation, i.e., the conversion of integer numbers back to floating-point. These operations may be executed iteratively using different range limits, which cut/clip values may be set in an automated fashion. After each iteration of setting clipping values and quantizing and de-quantizing, subsequent error measurement is done between the original floating-point input and its de-quantized (also floating-point) counterpart to determine the quality of the chosen limits. It is important that quantization and de-quantization are performed numerically exactly the same way as implemented in the PTQ framework 105, since by using mismatching schemes, the lowest quantization error may point to sub-optimal limits. Information on uniformity and symmetry may be decisive for this purpose, among several other properties. To ensure equivalence, various embodiments may provide a specific interface by which arbitrary user-defined quantization functions 109 may be integrated.

According to various embodiments, the interface for quantization and de-quantization may be as follows:

Q1—Quantization Interface

Input Argument(s)

1 The floating-point input data array to be quantized

2 The number of bits for which quantization shall be applied for

Optional Input Argument(s)

3 A user-provided minimum clipping value to be used instead of the global minimum of #1

4 A user-provided maximum clipping value to be used instead of the global maximum of #1

5 A user-provided quantization scale to be applied instead of the value calculated from #1

Output Value(s)

6 The integer output data array quantized to the selected number of bits (#2)

7 The calculated quantization scale

Q2—De-Quantization Interface

Input Argument(s)

1 The integer quantized input data array

2 The quantization scale

Output Value(s)

3 The de-quantized floating-point output data array

The interface may precisely define all input/output arguments that enable users to implement the desired quantization scheme in a standard way. As such, it may be ensured that such functionalities are performed exactly as during PTQ. This may be beneficial for subsequent steps.

FIG. 3 shows a high-level depiction 300 of symmetric, linear uniform quantization. As an example, the quantization and de-quantization schemes for symmetric, linear, uniform b=8 bit quantization mode are detailed. Let us assume an input distribution x with the data ranging from −4.893 to +5.143. As shown in FIG. 3, following the rules of the above quantization scheme, the observed floating-point values 302 may first be limited to the symmetric range −max(|x|) . . . +max(|x|), then assigned to integer values 304 between $-2^b = -128 \rightarrow +2^b - 1 = +127$ by computing a scaling factor s:

$$s = \frac{(2^b - 1)/2}{\max(|x|)} = \tag{2}$$

$$\frac{127.5}{5.143} = 24.79 \rightarrow \text{Quantize: } qx = \text{round}(\text{clip}(x \cdot s, \{-128, +127\}))$$

$$\rightarrow De\text{-Quantize: } \hat{x} = \frac{qx}{s} \tag{3}$$

As illustrated in FIG. 3, some floating-point values 306 may get assigned to the same integer bin 308, which may for example lead to the emergence of error during the quantization process.

As for the connection of the equations to the above interfaces, parameters #1 and #2 of the quantization interface Q1 may directly be utilized by Equation 2. The quantized array and the computed scale in Equation 2 may correspond to #6 and #7 in the Q1 interface. Following Equation 3 and the de-quantization interface Q2, the de-quantized data array (#3) may be meant to be calculated by dividing the quantized array (#1) with the scale (#2). In the above example, the Q1 interface is not fully utilized; the optional arguments #3, #4, #5 may be defined for more advanced use-cases where the lower and upper clipping values, as well as the scale may be additionally manipulated.

Next in the flow, the quantization error may be calculated (in error calculation block 112) between the original floating-point input data array and its de-quantized also floating-point counterpart. Herein, the exact mathematical formulation for error calculation may be selected by the user from a set of possible metrics, including the Mean Squared Error (MSE), Mean Average Error (MAE), Peak Signal to Noise Ratio (PSNR), or the KLD (Kullback-Leibler Divergence) metric, for example. The feature selection may be enabled by the configuration file 107, as an input to the framework according to various embodiments.

According to various embodiments, the robust and fast calculable MSE metric may be used, computed as:

$$MSE = \frac{1}{n}\sum_{i=0}^{n-1}(x_i - \hat{x}_i) \qquad (4)$$

wherein $x_i$ denote the ith element of the original input distribution x and $\hat{x}_i$ denotes the ith element of the de-quantized distribution $\hat{x}$.

As stated above, the data range settings, corresponding to the lowest quantization error, may be identified in an automated manner for which the previous chain of operations may be executed iteratively. For example, the parameter extraction of the input data and the user-selected error metric may be used, utilizing the quantization and de-quantization interfaces Q1 and Q2 to quantize the input data using different minimum/maximum clipping values. The minimum clipping value and the maximum clipping value may be referred to as clipping limits and may be set in the clipping limits setting block 113. Despite the need to re-iterate over the quantization, de-quantization and error calculation steps, the runtime complexity of the method according to various embodiments may be logarithmic even in the worst case, i.e., O(log(n)) with n being the number of clipping values to be tested for.

As a last step in the flow, once the clipping values for which the chosen quantization error metric became minimal has been determined, data set distillation may take place in dataset distillation block 114. Herein, actual clipping of the data does not happen; instead, the selective extraction of a small subset of valid input elements which span the found value range best may be provided. The exact amount may be user-selectable and may be set using the aforementioned configuration file 107. The distilled subset of elements constitutes the representative input data set 108 which may be the final output according to various embodiments.

Certain user-selectable settings may be provided via a user configuration file 107.

FIG. 4 shows an illustration 400 of an exemplary user configuration file according to various embodiments. Herein, the concrete statistical methods for calculating some form of mean and variance of the distribution may be selected (lines 2-3), as well as the quantization error calculation metric (line 4), and the amount of data to be extracted from the original inputs during distillation as a percentual value (line 5). In this example, the median was chosen as a metric of mean, the Median Absolute Deviation as a metric of variance, the Mean Squared Error for quantization error and 0.015% as a proportion of the input data set to be distilled.

FIG. 5 shows a histogram 500 of the distribution of a double-sided (positive/negative) input tensor and of an exemplary result of various embodiments. The x axis 502 indicates value, and the y axis 504 indicates the frequency of the value being observed. The image incorporates multiple histograms. Resembling a positive/negative double-sided Laplacian-like distribution, the full input data set of a particular ANN input is shown by the light gray histogram 510. The dynamic range of the data is considerably large (−8.67 to +9.62) and includes a visually noticeable number of outliers as the range grows beyond −350 and +385 times the standard deviation σ.

The method according to various embodiments here was configured to the exact same settings as shown in FIG. 4.

The data limits, leading to the lowest quantization error, may successfully be identified by the method for the above configurations, and are marked by vertical lines 506 and 508. The results of data set distillation are represented by the overlapping darker histograms 512, which inputs have been found to span the previously identified range best.

One advantage of various embodiments is that the representative input dataset may be identified and extracted purely using mathematical methods, instead of subjective manual input selection. Moreover, using the distilled data for calibration may have improved quantization accuracy with even the most basic PTQ settings 105 since a major proportion of outliers may be discarded, which do not represent the input data set well. Furthermore, by using the distilled data set, quantization calibration time may be reduced (for example by 99.87% in various experiments). The one-time overhead of executing the proposed flow for every input may be comparable to executing the quantization calibration process once on the full input data set. However, the latter process is typically executed numerous times during quantization exploration. The benefits of using various embodiments thus significantly outweighs its execution overhead, especially, if quantization calibration needs to take place using a target hardware emulator.

Various embodiments are tool- and model-agnostic, i.e., they do not rely on any training tools, they do not require source code access to the ANN model, nor to the PTQ framework. Various embodiments may lie between training and post-training, and may thus be independent from the training and post-training toolchains, making it ideally applicable in production environments.

Various embodiments may make no assumptions on the input data distribution. Instead, analysis according to various embodiments may be based on measurement, i.e., the iterative automated minimization of quantization error to find the best clipping range.

Instead of applying intrusive hard clipping of input data elements (for example extracting certain statistical properties of inputs and applying clipping and quantization error measurement), according to various embodiments, data set distillation is provided, i.e., the extraction of the representative input dataset as a (tiny) fraction of valid data elements within the complete input data set that fit best in the identified clipping interval.

According to various embodiments, the representative data set may be identified and extracted from a larger set, which may require in common practice subjective manual analysis and selection of, e.g., input images from distinct scenarios. An advantage of various embodiments may be that the representative input dataset is identified and extracted purely using automated methods as described herein.

According to various embodiments, the extraction of the representative input data set may reduce quantization calibration time.

FIG. 6A shows a flow diagram 600 illustrating a method for determining a representative input data set for post-training quantization of artificial neural networks according to various embodiments. At 602, an input data set may be acquired. At 604, the input data set may be processed to extract one or more parameters associated with the input data set, wherein metrics applied to the input data set to extract the one or more parameters are based on user input. At 606, based on the extracted one or more parameters, initial values for clipping limits may be set, wherein the clipping limits include a lower clipping limit and an upper clipping limit, wherein the lower clipping limit and the upper clipping limit define threshold values for limiting a value range of the input data set. At 608, the upper and lower clipping limits may be adapted by computing a quantization error based on a numerical difference between the input data set and a quantized and a dequantized input data set, wherein the error is computed based on an error metric which is based on user input. FIG. 6B shows a flow diagram 650 of the adapting. At 652, the input data set may be quantized by mapping values of the input data set from a set of higher numerical precision to values of lower numerical precision based on the one or more extracted parameters and the clipping limits. At 654, the quantized input data set may be dequantized by mapping values of the quantized input data set from lower numerical precision back to higher numerical precision based on the one or more extracted parameters and the clipping limits. At 656, the quantization error may be computed based on the numerical difference between the input data set and the quantized and dequantized input data set. At 658, the clipping limits may be adapted based on the computed quantization error. As shown in FIG. 6A, at 610, a representative input data set may be determined as a subset of the input data set whose elements fit within the clipping limits; wherein the representative input data set is to be used for quantization calibration of the post-training quantization.

According to various embodiments, the clipping limits may be adapted until a difference between changed clipping limits from one iteration to another iteration are below a pre-determined threshold.

According to various embodiments, the threshold may be based on the input data set, preferably one or more parameters defined by the input data set, and the threshold is based on user-input.

According to various embodiments, the user input may be provided in a configuration file, preferably a textual configuration file.

According to various embodiments, the clipping limits may define a lower threshold and an upper threshold which are used to delimit the quantization of the input data set.

According to various embodiments, the method may further include determining a scale, wherein the scale is used for quantization and dequantization.

According to various embodiments, determining the representative input data set may include determining an overlap between an interval defined by the clipping limits and the input data set.

According to various embodiments, the quantization error may be determined based on a user-defined error function.

According to various embodiments, the quantization error may be determined based on a mean squared error and/or a mean average error and/or a peak signal to noise ratio and/or the a Kullback-Leibler divergence metric.

According to various embodiments, quantization calibration may include calibrating parameters for a network quantization of artificial neural networks.

According to various embodiments, the artificial neural network may be deployed on a resource-constrained embedded system.

According to various embodiments, the embedded system may be a mobile computing device, a mobile phone, a tablet computing device, an automotive compute platform, or an edge device.

FIG. 7 shows a determination system 700 according to various embodiments. The determination system 700 may include an input module 702, an extraction module 704, a clipping limits initialization module 706, and an adaption module 708. The input module 702, the extraction module 704, the clipping limits initialization module 706, the adaption module 708, and the determination module 710 may be coupled with each other, e.g. via an electrical connection 712, such as e.g. a cable or a computer bus or via any other suitable electrical connection to exchange electrical signals.

The input module 702 may be configured to acquire an input data set.

The extraction module 704 may be configured to process the input data set to extract one or more parameters associated with the input data set, wherein metrics applied to the input data set to extract the one or more parameters may be based on user input;

The clipping limits initialization module 706 may be configured to, based on the extracted one or more parameters, set clipping limits including a lower clipping limit and an upper clipping limit, wherein the lower clipping limit and the upper clipping limit define threshold values for limiting a value range of the input data set;

The adaption module 708 may be configured to adapt the upper and lower clipping limits by computing a quantization error based on a numerical difference between the input data set and a quantized and a dequantized input data set, wherein the error is computed based on an error metric which is based on user input.

The determination module 710 may be configured to determine a representative input data set as a subset of the input data set whose elements fit within the clipping limits; wherein the representative input data set is to be used for quantization calibration of the post-training quantization.

A "module" may be understood as any kind of a logic implementing entity, which may be special purpose circuitry or a processor executing a program stored in a memory, firmware, or any combination thereof.

FIG. 8 shows a computer system 800 with a plurality of computer hardware components configured to carry out steps of a computer implemented method for determining a representative input data set for post-training quantization of artificial neural networks according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the determination system 700 and/or for the computer system 800.

REFERENCE NUMERAL LIST

100 illustration of a high-level block diagram of a system according to various embodiments;
101 input data set
102 training tool
103 ANN model
104 quantization calibration
105 post-training quantization
107 configuration file
108 representative input data
109 user-defined quantization function
110 parameter extraction
111 quantization and de-quantization
112 error calculation
113 clipping limits setting
114 dataset distillation
200 histogram of a zero-centered normal distribution;
202 x axis
204 y axis
206 curve showing observed values
208 full dynamic range
210 reduced dynamic range
212 possible outliers
214 possible outliers
300 high-level depiction of symmetric, linear uniform quantization
302 observed floating-point values
304 integer values
306 floating-point values which may get assigned to the same integer bin
308 same integer bin to which floating-point values may get assigned
400 illustration of an exemplary user configuration file
500 illustration of an exemplary result of various embodiments.
502 x axis
504 y axis
506 vertical line indicating lower clipping limit
508 vertical line indicating upper clipping limit
510 histogram
512 histograms representing results of data set distillation
600 flow diagram illustrating a method for determining a representative input data set for post-training quantization of artificial neural networks according to various embodiments
602 step of acquiring an input data set
604 step of processing the input data set
606 step of setting initial values for clipping limits

608 step of adapting
610 step of determining a representative input data set as a subset of the input data set whose elements fit within the clipping limits
650 flow diagram illustrating the adapting
652 step of quantizing the input data set based on the one or more extracted parameters and the clipping limits
654 step of dequantizing the quantized input data set based on the one or more extracted parameters and the clipping limits
656 step of computing a quantization error based on a numerical difference between the input data set and the quantized and dequantized input data set
658 step of adapting the clipping limits based on the computed quantization error
700 determination system
702 input module
704 extraction module
706 clipping limits initialization module
708 adaption module
710 determination module
712 connection
800 computer system according to various embodiments
802 processor
804 memory
806 non-transitory data storage
808 connection

The invention claimed is:

1. Computer implemented method for determining a representative input data set for post-training quantization of artificial neural networks, the method comprising of the following steps:

acquiring an input data set;

processing the input data set to extract one or more parameters associated with the input data set, wherein metrics applied to the input data set to extract the one or more parameters are based on user input;

based on the extracted one or more parameters, setting initial values for clipping limits comprising a lower clipping limit and an upper clipping limit, wherein the lower clipping limit and the upper clipping limit define threshold values for limiting a value range of the input data set;

adapting the upper and lower clipping limits by computing a quantization error based on a numerical difference between the input data set and a quantized and a dequantized input data set, wherein the error is computed based on an error metric which is based on user input; and determining a representative input data set as a subset of the input data set whose elements fit within the clipping limits; wherein the representative input data set is to be used for quantization calibration of the post-training quantization.

2. The method of claim 1, wherein the upper and lower clipping limits are adapted by iteratively carrying out:

quantizing the input data set by mapping values of the input data set from a set of higher numerical precision to values of lower numerical precision based on the one or more extracted parameters and the clipping limits;

dequantizing the quantized input data set by mapping values of the quantized input data set from lower numerical precision back to higher numerical precision based on the one or more extracted parameters and the clipping limits;

computing the quantization error based on the numerical difference between the input data set and the quantized and dequantized input data set; and adapting the clipping limits based on the computed quantization error.

3. The method of claim 1, wherein the clipping limits are adapted until a difference between changed clipping limits from one iteration to another iteration are below a predetermined threshold.

4. The method of claim 3, wherein the threshold is based on the input data set, preferably one or more parameters defined by the input data set; and wherein the threshold is based on user-input.

5. The method of claim 1, wherein the user input is provided in a configuration file, preferably a textual configuration file.

6. The method of claim 1, wherein the clipping limits define a lower threshold and an upper threshold which are used to delimit the quantization of the input data set.

7. The method of claim 1, further comprising: determining a scale, wherein the scale is used for quantization and dequantization.

8. The method of claim 1, wherein determining the representative input data set comprises determining an overlap between an interval defined by the clipping limits and the input data set.

9. The method of claim 1, wherein the quantization error is determined based on a user-defined error function; and/or wherein the quantization error is determined based on a mean squared error and/or a mean average error and/or a peak signal to noise ratio and/or the a Kullback-Leibler divergence metric.

10. The method of claim 1, wherein quantization calibration comprises calibrating parameters for a network quantization of artificial neural networks.

11. The method of claim 1, wherein the artificial neural network is to be deployed on a resource-constrained embedded system.

12. The method of claim 11, wherein the embedded system is a mobile computing device, a mobile phone, a tablet computing device, an automotive compute platform, or an edge device.

13. A Computer system comprising a plurality of computer hardware components configured to carry out steps of the method of claim 1.

14. Non-transitory computer readable medium comprising instructions for carrying out the method of claim 1.

* * * * *